(12) United States Patent
Motsenbocker (10) Patent No.: US 9,948,138 B2
(45) Date of Patent: Apr. 17, 2018

(54) SMART DC GRID AND SMART POWER OUTLET

(71) Applicant: Marvin Motsenbocker, Kamijima cho (JP)

(72) Inventor: Marvin Motsenbocker, Kamijima cho (JP)

( * ) Notice: Subject to any disclaimer, the term of this patent is extended or adjusted under 35 U.S.C. 154(b) by 171 days.

(21) Appl. No.: 15/149,135

(22) Filed: May 8, 2016

(65) Prior Publication Data
US 2017/0047771 A1   Feb. 16, 2017

Related U.S. Application Data

(63) Continuation-in-part of application No. 14/941,598, filed on Nov. 15, 2015.

(60) Provisional application No. 62/102,030, filed on Jan. 11, 2015, provisional application No. 62/205,664, (Continued)

(51) Int. Cl.
| | |
|---|---|
| *H02J 3/38* | (2006.01) |
| *H02J 7/35* | (2006.01) |
| *H02J 1/10* | (2006.01) |
| *H02J 7/00* | (2006.01) |
| *G05F 1/67* | (2006.01) |
| *H02J 1/08* | (2006.01) |
| *H02J 3/02* | (2006.01) |
| *H02J 7/34* | (2006.01) |
| *H02J 1/00* | (2006.01) |
| *H04L 29/08* | (2006.01) |
| *H04B 3/54* | (2006.01) |

(52) U.S. Cl.
CPC ............. *H02J 7/35* (2013.01); *G05F 1/67* (2013.01); *H02J 1/08* (2013.01); *H02J 1/102* (2013.01); *H02J 3/02* (2013.01); *H02J 3/383* (2013.01); *H02J 7/0068* (2013.01); *H02J 7/34* (2013.01); *H02J 2001/004* (2013.01); *H02J 2001/008* (2013.01); *H02J 2007/0001* (2013.01); *H04B 3/54* (2013.01); *H04L 67/12* (2013.01); *Y02E 10/563* (2013.01); *Y02E 10/566* (2013.01); *Y02E 10/58* (2013.01); *Y02E 10/766* (2013.01)

(58) Field of Classification Search
None
See application file for complete search history.

(56) References Cited

U.S. PATENT DOCUMENTS 7,221,106 B1 * 5/2007 Nemir ................. H02M 5/2573
                                                    307/132 R
7,800,346 B2 * 9/2010 Bolz ...................... H02J 7/0014
                                                    320/116

(Continued)

*Primary Examiner* — Lincoln Donovan
*Assistant Examiner* — Khareem E Almo
(74) *Attorney, Agent, or Firm* — Marvin Motsenbocker (57) ABSTRACT

The disclosed smart receptacle allows use of high voltage DC power, typically between 100 and 120 volts, for regular appliances such as computers and cell phone power adapters, coffee pots, heaters and some motorized devices. The receptacle prevents use of the DC power by AC appliances by monitoring for amount and or quality of inductance of a plugged in appliance. Other embodiments include local grid structures that provide locally resilient sources of energy, particularly solar electric energy, and methods for sharing power. One such embodiment provides a comprehensive apparatus that provides energy cost lowering and backup power by connection to utility power and to DC power such as from a DC grid or solar panels, while providing power to DC appliances.

20 Claims, 4 Drawing Sheets

Related U.S. Application Data filed on Aug. 15, 2015, provisional application No. 62/297,877, filed on Feb. 21, 2016.

(56) References Cited

U.S. PATENT DOCUMENTS

| | | | | |
|---|---|---|---|---|
| 7,808,219 | B2* | 10/2010 | Ye | H02M 7/2176 |
| | | | | 323/224 |
| 8,374,729 | B2* | 2/2013 | Chapel | H02J 13/0082 |
| | | | | 700/295 |
| 8,938,322 | B2* | 1/2015 | Westergaard | H02J 3/14 |
| | | | | 700/291 |
| 9,088,055 | B2* | 7/2015 | Adipietro | H01M 10/465 |
| 9,172,245 | B1* | 10/2015 | Lentine | H02J 3/00 |
| 9,270,116 | B2* | 2/2016 | Adams | H02J 3/14 |
| 9,360,528 | B2* | 6/2016 | Barfield | G01R 19/00 |
| 9,577,432 | B2* | 2/2017 | Li | H02J 4/00 |
| 9,588,534 | B2* | 3/2017 | Chapel | H04L 12/4633 |
| 9,692,259 | B2* | 6/2017 | Boss | H02J 13/0062 |
| 9,783,071 | B2* | 10/2017 | Gaul | B60L 3/0069 |
| 9,787,195 | B1* | 10/2017 | Xiong | H02M 3/33507 |
| 2004/0135530 | A1* | 7/2004 | Liu | H02P 6/16 |
| | | | | 318/400.34 |
| 2007/0113595 | A1* | 5/2007 | Harwood | D06F 33/02 |
| | | | | 68/12.01 |
| 2008/0310967 | A1* | 12/2008 | Franz | F04D 27/004 |
| | | | | 417/32 |
| 2016/0365817 | A1* | 12/2016 | Schuster | H02P 23/26 |

* cited by examiner

SMART DC GRID AND SMART POWER OUTLET

RELATED U.S. APPLICATION DATA

This application is a continuation in part of U.S. Ser. No. 14/941,598 "DC Power Grid and Equipment" and specifically incorporates by reference in their entireties U.S. Provisional No. 62/080,349 filed Nov. 16, 2014 entitled "D.C. Power Grid and Equipment," and from U.S. Provisional No. 62/102,030 filed Jan. 11, 2005 entitled "D.C. Power Grid and Equipment," and from U.S. Provisional No. 62/144,320 filed Apr. 7, 2015 entitled "D.C. Power Grid and Equipment," and from U.S. Provisional No. 62/205,664 filed Aug. 15, 2015 entitled "D.C. Power Grid and Equipment" and U.S. Utility Ser. No. 14/941,598 filed Nov. 15, 2015 entitled "D.C. Power Grid and Equipment."

FIELD

Embodiments relate to solar energy and particularly to distribution and use of direct current electrical energy.

BACKGROUND

The world needs simple, self-regulating, cheap and very efficient local power, which would provide immense benefits, in making more energy available to users, lowering infrastructure costs and providing energy resilience.

SUMMARY

An embodiment provides a smart DC outlet that protects accidental powering certain inductive loads from direct current. In an embodiment the outlet provides pulsing DC and senses kick back pulses such as back EMF from collapsing current from a transformer, motor windings or other inductor and disconnects the DC power to an inappropriate appliance having a kick back voltage or current or qualitative determination above a threshold. An embodiment allows a user to override the outlet sensing so that a DC compatible electric motor such as a vacuum cleaner, which creates back EMF, may be operated from the outlet. Optionally the switch will reset to sensing after the motor is turned off. An embodiment differentially senses a connected transformer vs a motor winding and optionally does not provide this choice if the sensed appliance is a transformer.

Another embodiment provides a non bucking solar panel charge controller interposed between a significantly higher (eg. at least 10 volts higher, at least 25 volts higher, or at least 50 volts higher) voltage source of solar electric power or grid power, and a battery. The controller provides direct current connected from that higher voltage power to charge the battery. The controller comprises a phase width modulation circuit to charge a battery (with optional parallel capacitor of at least 0.1 Farad attached) and optionally supply power to a load connected in parallel with the battery without using a buck converter inductance to convert solar panel high voltage to the lower battery voltage. In an embodiment the charge controller provides a charging current with a low duty cycle of less than 25%, preferably less than 20%, more preferably less than 10% and yet more preferably less than 8%. In an embodiment the lower duty cycle but high voltage difference provides surprisingly enhanced battery life by minimizing plate sulphation.

Another embodiment provides a grid communicated priority signal to alert and/or manage local grid power usage between nodes. In an embodiment the priority signal is a low frequency sine wave. Preferably the sine wave is between 20 hertz and 1 megahertz and more preferably between 25 kilohertz and 100 kilohertz. In an embodiment multiple signals are used with frequency selective detection for communication. In an embodiment the strength of an injected signal is used to determine the extent of region of control such that nodes that receive a below threshold signal level are not subject to the control. In an embodiment each node injects the signal and monitors each connected line for connection to ground and disconnects that line when the signal is sensed between that line and earth ground. In an embodiment an electrical resilience apparatus is provided that allows economical creation and use of solar energy to supplement utility grid energy and also as a back up for off-grid power.

Another embodiment provides a convenient power center apparatus that accepts utility grid power and/or solar panel power and/or local grid power to provide local supplementation to utility purchased power and for back up. In a stand alone configuration, utility power is combined with connected solar panel power and the user can switch to utility backup or complete off-utility grid. In a local grid configuration, the apparatus can act as a node or be connected to a node and take power from a local grid and/or supply power to the local grid.

This apparatus can simplify and economize energy resiliency by allowing the same device to collect electric energy from at least solar panels or from two sources, and directly (as DC or pulsing DC power) supply power adapters that use DC power and other tools such as electric drills preferably via a smart receptacle built in. Furthermore the apparatus can optionally charge a connected battery for backup power. In an embodiment the connected battery can supply DC power to the connected appliance. In an embodiment the connected battery has a voltage of about 100 volts (preferably 100-120 volts) and is charged and used for power backup at nighttime. Preferably eight 12-volt lead acid batteries are used in series, and are charged by a set of solar panels in series (typically at least 108 volt maximum power voltage) without an energy consuming induction based boost or buck conversion. Also the apparatus preferably has 12 volt or 24 volt outlets to directly connect LED lights, and optionally a DC to AC inverter for small appliances such as refrigerators that need AC and use the connected battery power as a backup.

ROBUST LOCAL GRIDS ELIMINATE OR MINIMIZE CHARGE CONTROLLERS INVERTERS AND CONVERTERS

Much if not most cost, complexity and reliability issues in solar electric power systems arise from the need for multiple circuits within charge controllers, inverters and converters, to serially massage the solar electric energy into suitable forms. In embodiments, low cost, low complexity and high efficiency are obtained by choosing a solar panel system voltage that is only nominally higher than the end-use power voltage, and using pulsing direct current from this matched power to run appliances. For a 100 to 120 volt system, preferably, the solar panel system voltage is between 105 volts and 145 volts, determined as maximum power point voltage at 25 degrees Celsius for panels connected in series. More preferably the solar panel system voltage is between 10-20 volts higher than the end-use power voltage. For a 380 volt system used in for example computer server centers the system panel voltage preferably is 30-80 volts higher.

In a preferred embodiment, the end-use voltage is about 100 volts (between 98 and 108 volts, more preferably between 100 to 105 volts in the case of Japan, and is about 115 volts (between 110 and 125 volts) in the case of the United States. By using solar panel systems of about 10 volts higher, solar panel voltage loss due to high temperatures can be accommodated and the solar panel output can be fed to the end-use power with a simple PWM circuit. The PWM circuit preferably has at least a 3% off time (maximum 97% duty cycle) and the duty cycle can be adjusted as desired to match the slightly higher solar panel voltage with end use appliance voltage. This is because generally, appliance heating (heat loss in wires, etc.) is the main limitation to voltage, and decreasing duty cycle functionally has a very similar effect as decreasing voltage.

Figure 1:
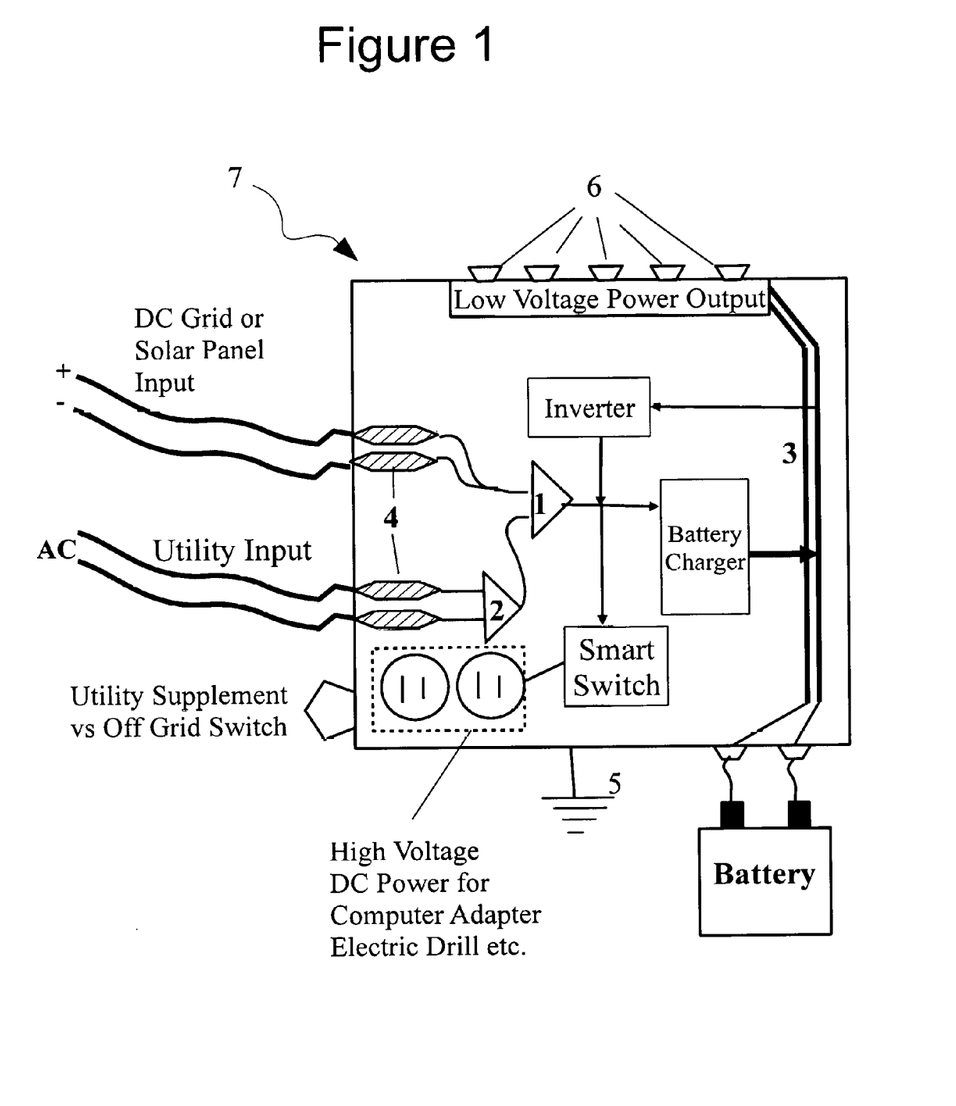
FIG. 1 shows a representative entry level power device for providing reliable direct current power.

By using this technique of matching input power voltages to load voltages, a simplified and inexpensive system was built, as described in FIG. 1.

DC Switching to High Power Appliances

It was found that, using commercially available equipment designed for home use, high power devices, typically above 100 watts, particularly above 200 watts and especially above 500 watts generally will require a pulsing DC power to prevent welding of the control switch and/or internal thermostat. Higher power devices such as water heaters, coffee makers and electric grills were powered from a DC house grid by pulsing the DC to avoid melting the switch contacts. Preferably, a long duty cycle of at least 90% and more preferably more than 95% is used with a frequency of more than 2 hertz but less than 10,000 hertz.

Figure 2:
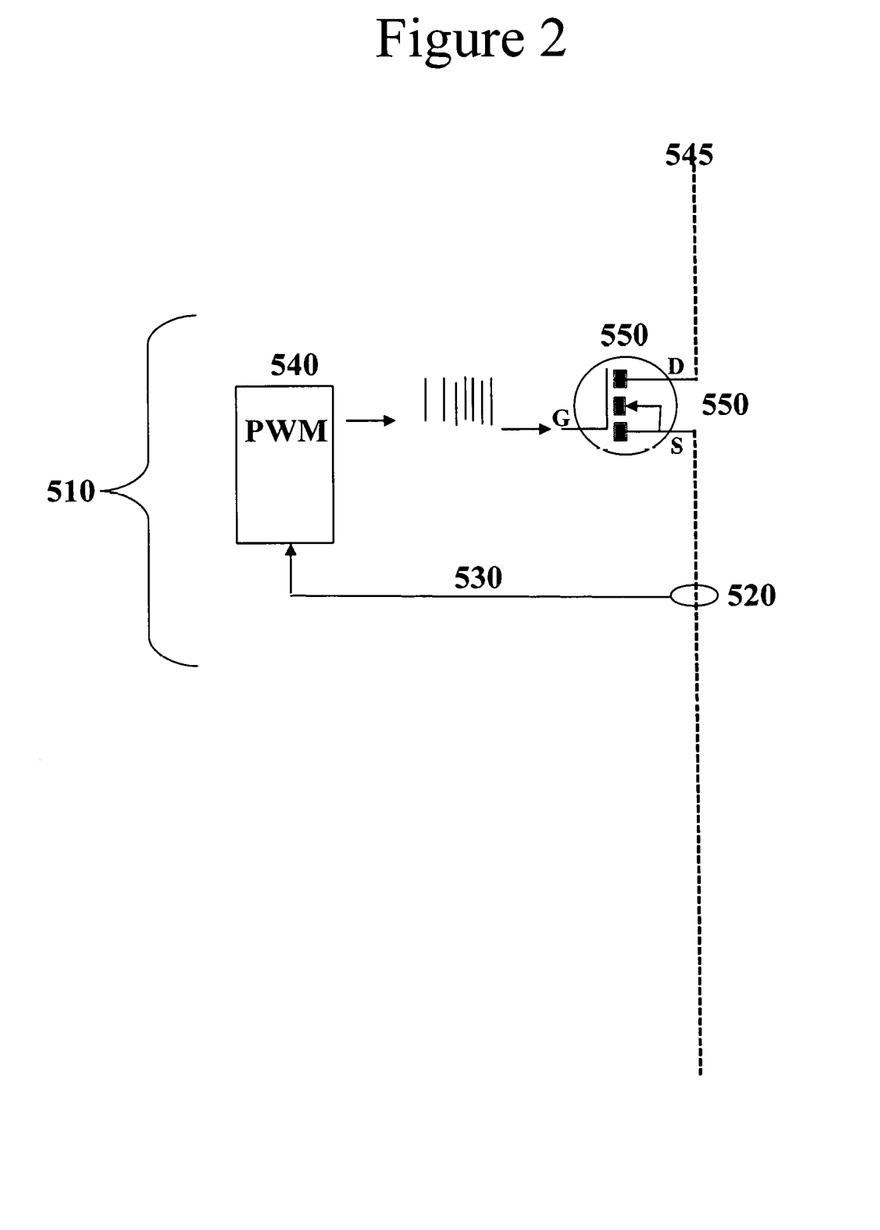
FIG. 2 shows a preferred circuit outline for providing DC power.

In an embodiment, a DC switcher circuit includes a PWM controller (such as that shown in FIG. 2, which provides a switch square wave pulse between 25 and 1000 Hz. Preferably the controller includes a feedback circuit that responds to a decrease in supply voltage by decreasing duty cycle. For example, when attached to a grid node with a target voltage of 105 volts, if the node voltage goes below 105 volts (or other set value such as 103, 102, or 100 volts) the DC switcher circuit decreases duty cycle to compensate. The popular TL494 PWM chip can easily implement this with one of its error amplifiers using sampled input voltage compared with a 5 volt reference.

Load Connections to and From the Grid

Preferably DC electric energy from the grid is converted into pulsing DC by a circuit within the box of FIG. 1 so that regular switches and breakers and thermostats can work properly without becoming welded shut from the high DC currents. Preferably a high current load having such switch which is designed for alternating current loads is connected to the DC grid via a phase width modulated pulsed signal of at least 10 hertz, preferably between 25 and 500 hertz and preferably between 50 and 200 hertz with a short off time duty cycle.

The pulsed DC power need not be square wave but modified square wave can be used (as is known in modified sine wave inverter technology). Other forms are acceptable if voltage at some point in the cycle becomes near to reaches zero, as suited to prevent spark formation during mechanical switching. In an embodiment for low priority loads such as water heaters, electric heaters and even some air conditioning DC pumps (which normally modulate between 40% and 100% power anyway) the duty cycle is controlled in response to grid voltage, so that power supplied to the load adjusts to help maintain a suitable grid voltage.

Low current loads (which are often high priority and may be serviced by a separate wire pair) preferably are not so modulated. Examples of low current loads include computer, printer and monitor adapters (which don't use traditional transformer voltage conversion), which can be directly plugged into DC voltage. Other low current loads can include lights, and battery charging. In an embodiment, low current loads less than 3 amp, 2 amp or in some cases no more than 1 amp (preferably between 50-200 volts) such as a cell phone charger, lap top computer, LED lighting, and the like are supplied with constant current DC power. High current loads that have mechanical thermostats or other switches preferably are supplied with pulsing DC to protect those switches. In an embodiment all DC loads are supplied by pulsing DC power and also to a DC outlet that monitors for inductive loads by switching off or switching to alternating current when incorrect inductive loads such as transformers or AC induction motors are used.

Electrical Resilience Apparatus ("ERA")

In an embodiment a local user has an electrical box for providing at least some of his own power off-utility grid from connected power supplies such as solar panels, wind turbines, electric car batteries, fuel cells, and the like, and which optionally may be connected to a local DC grid. This local use electricity box ("ERA") may be mounted to the outside of a building in a weather proof configuration and may contain one or more additional components such as a. sensors for repeated measurement of voltage and current though the box to/from a local grid, b. power usage recording device such as a downloadable memory that records voltage and current at periodic intervals, c. internet connection, d. cell phone connection to report power usage and/or offers and acceptances for power sales and use with other grid members, e. sensor/tester to determine resistance to the adjacent connected node and f. automated current governor that prevents overload of grid connection wires by monitoring current and limiting current from the node via PWM decrease in duty cycle or other limiter.

A particularly desirable ERA embodiment that can serve as a stand alone energy device or as a grid node connection device is shown in FIG. 1. This figure displays an ERA depicted as box 7, but which can exist as separate devices wired together at the same or at disparate locations. Preferably a DC grid connection together with a local solar power connection (and optionally wind power input connection) are included but only one DC Grid or Solar Panel Input is shown here.

Box 7 includes at least one DC to pulsed DC circuit with input voltage feedback control. In a first prototype, this circuit was located in circuit 1 (see as a triangle) in FIG. 1 This pulsed circuit preferably is a phase width modulation ("PWM") driven power switch (such as MOSFET or IGBT) that is controllable. In an embodiment, the control of threshold voltage feedback control at circuit 1 is carried out by a switch, to allow activation of pulses above a given input voltage, with selection between two priority levels. A lower threshold level provides higher priority because the power is used (converted to PWM pulses) down to lower input voltages and a higher threshold voltage level is used for lower priority loads, which are only provided power when higher input supply voltages are available. In an embodiment, a user switches between two priorities, or even three priorities or more, which optionally are available in real time or variably during scheduled times. The switch may be via push button, toggle switch, or the like, or may be selected by internet, cell phone, or other wired or wireless signal mechanism.

In an embodiment the threshold controlled pulsing circuit only feeds the output (shown as "smart switch" in FIG. 1) and straight DC feeds the optional (if used) battery charger. In another embodiment a separate higher priority adjusted circuit feeds the battery charger and a lower priority adjusted circuit feeds the power output (smart switch) so that the battery is charged even at lower node voltages when lower priority loads are not supplied from the node.

In an embodiment, all DC inputs in the ERA are subjected to PWM control (see for example FIG. 2) and the controlled power is provided to one or more receptacles such as that shown in FIG. 1. In another embodiment, only the solar power input and/or connected grid input is PWM controlled by voltage. The utility and optionally connected local grid power is PWM controlled to provide pulses but are not input voltage controlled, in another embodiment.

In an embodiment, supplied utility AC power or inverted AC from battery or high voltage power is provided directly as AC to the receptacle when an appliance is set (user selection) or automatically detected as an AC appliance. In an embodiment a PWM controller supplies solar electric and/or battery energy from the ERA to the grid. In an embodiment this supply is carried out using output (connected grid) voltage feedback to achieve a sufficiently high local node voltage. In an embodiment this supply is carried out using input voltage feedback to achieve more optimum loading of the power source, because both battery and solar panels should not be overloaded for maximum efficiency. In a desirable embodiment, both load voltage and input voltage are used to control duty cycle in the PWM circuit. In another preferred embodiment, the PWM circuit that provides pulsed DC power for local use at the ERA monitors output current and controls for (limits) maximum current.

In embodiments one or more of these input lines is earth ground default protected by optional sensor/interrupter 4. An optional connection to earth-ground 5 is shown at the bottom of this box. Also, in a preferred embodiment the AC utility input is provided from an isolation transformer and there is no direct connection to the utility and the utility ground.

The AC utility input is converted to DC at circuit 2 and both sources are combined in parallel at section 1 in this diagram. Although not shown here, one or both of these inputs can be modulated (for example by PWM) to limit their input, although this is not preferred for the simplest embodiments. A user operated switch is shown on the lower left, which allows a user to select to go off grid (no power flow connection from the utility input) or to allow both powers to be used simultaneously. For example, preferably the DC input power is at a higher voltage than the rectified AC utility power and connected in parallel. In this case, the DC input power preferentially is used to power the battery charger and the DC power outputs to LEDs and to the high voltage receptacle with no utility power usage. When the power consumption rises enough to become greater than the DC power input, the voltage drops until the voltage (at triangle 1 output in the figure) reaches the rectified utility power, at which point both sources are used simultaneously. Preferably a user alert such as bar LED displays or even a simple neon light for both power sources visually alerts the user when one or the other input is being used to provide power to this apparatus. An embodiment provides a user switch to disconnect from the local grid. In many embodiments however, the local grid and (backup) utility grid and even solar panel inputs are all connected in parallel, with reverse blocking diodes added as necessary to prevent power backflow into the solar panels and utility. Preferably only the locally connected solar electric (or other local node power source as listed above) is allowed to flow into the local grid connection, when the voltage is suitably high enough. In an embodiment a local node connected battery is switchably (user control) allowed to flow into the local grid to supply backup power to neighboring nodes.

The high voltage output power from 1 feeds a battery charger and a high voltage DC power outlet for one or more appliances. Optionally, as shown in this figure, the high voltage power to the high voltage DC power outlet is controlled by a smart switch to ensure that an improper appliance, such as a transformer adapter, AC induction motor or other high speed AC motor is not powered long enough to burn out. In such case, a regular (preferably 15 amp) receptacle is used to allow simple plugging in of the DC powered appliance such as a computer power adapter. In an embodiment, a switch is provided for flipping the polarity of the high voltage DC output, or this is switched automatically upon sensing that a plugged in power adapter needs to be reversed. The inventor surprisingly discovered that some power adapters rectify and use their AC input in a directional manner, and need to be plugged in with the correct negative and positive orientation. To accommodate this, the smart receptacle may test both directions of DC current flow and switch to the direction that yields current flow via a sensing and control circuit.

The battery charger accepts the high voltage DC power, which may be pulsed at this point by circuit 1 and converts to a lower voltage suitable for charging an attached battery as shown. In an embodiment, however, the DC power is at least 104 volts and charges eight 12-volt lead acid batteries connected in series, and the "96 volt" battery in this case is used directly to feed the high voltage DC power outlets without further conversion except for pulsing. In such case optionally the battery charger lacks an inductor based buck or boost circuit and more efficiently charges the battery by modifying the duty cycle of a higher voltage applied charging voltage. This allows a 96 volt lead acid battery bank to be used as a preferred night power backup for a local grid and/or for such use at just the node itself. In this case the high voltage battery can be connected in parallel with the other high voltage inputs to the high voltage DC output receptacle, and a typical (buck converter type) 12 volt output adapter can be used to provide the 12 volts from the high voltage battery. Of course, other voltages such as 24 volts may be used instead, particularly for LED lighting. In a preferred embodiment the high voltage DC (eg. 100-120 volt RMS DC) charges the low (12, 24, 48 etc. battery) directly via PWM pulsing directly without use of inductor or buck conversion at less than 25% duty cycle and particularly less than 8% duty cycle and even less than 5% duty cycle.

The connection to DC local grid preferably is not one way but preferably a separate solar panel input is tied to the DC local grid at circuit 1. Preferably current is allowed to flow in both directions based on voltage levels and operation of Kirchoff's laws. In this way, power will flow into the DC local grid from the connected system solar panels when the voltage on the local grid line from box 7 is higher than another neighboring node (after subtracting for voltage loss in the grid connection wire). This supply to the local DC grid additionally depends on whether the smart switch is not using all available power from the solar panel input. Preferably diode connections are made to prevent connected utility power from contributing to supply of excess generated power to the local DC grid in all circumstances.

This figure shows an optional low voltage buss vertically arranged at the right side inside box 7 and connecting the battery directly (or indirectly through a semiconductor switch that disconnects in the event of too low battery voltage) to the one or more low voltage power outlets 6 arranged horizontally along the top. Many users will want to use one or more of outlets 6 to run LED lighting but others may use one or more of these to exploit the large variety of 12 volt powered appliances such as car radios, ham radios, small water pumps and the like.

The preferred configuration shown in this figure also provides battery powered backup for high voltage appliances such as computer and cell phone power adapters via an inverter connected between the battery and the high voltage DC output receptacle. In a preferred embodiment not shown here, one or more USB power outlets are further included.

Priority Signal for Grid Power Sharing

Figure 3:
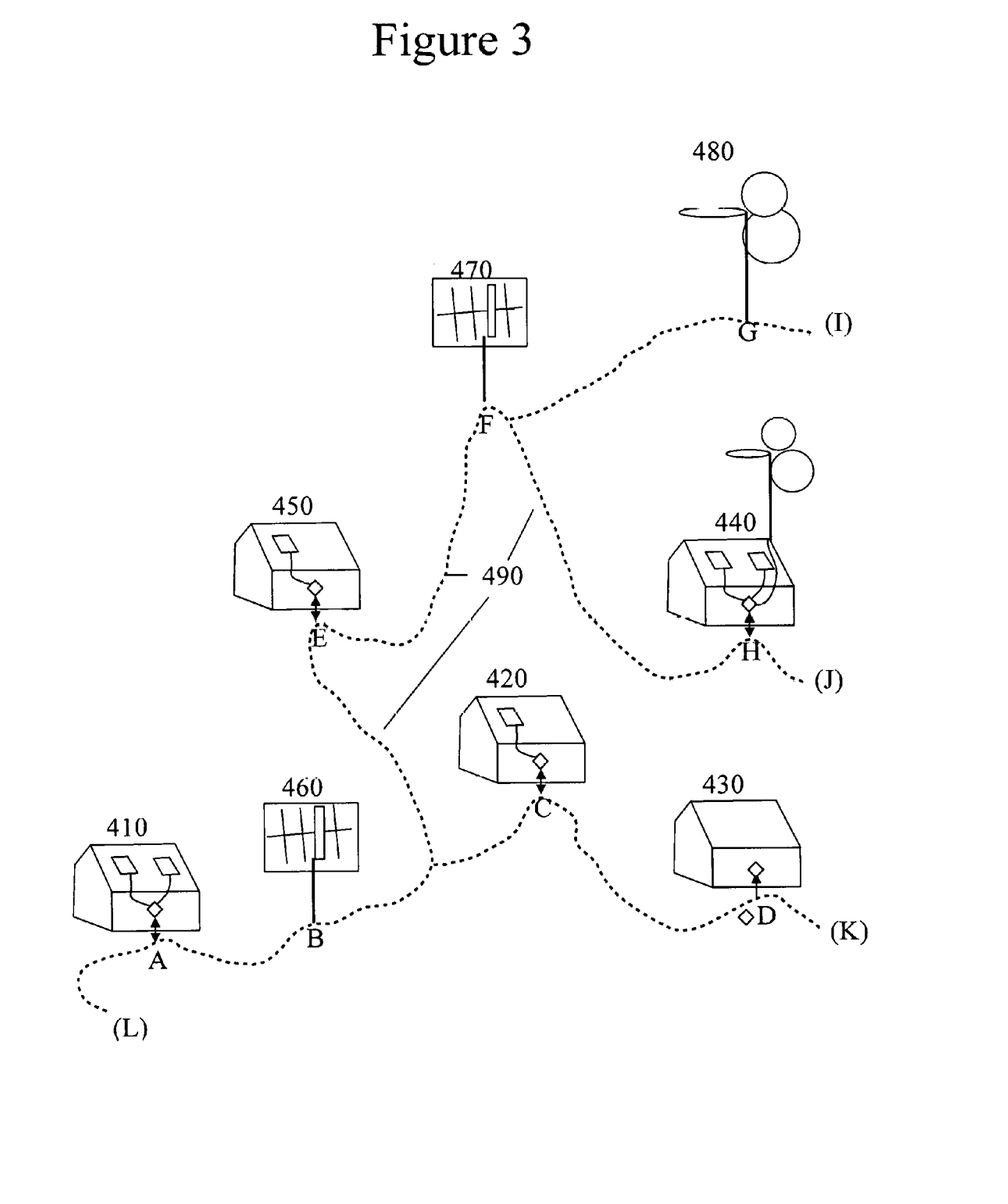
FIG. 3 is a diagram that shows a local grid comprising one or more power center apparatuses at each node.

An embodiment provides power sharing among neighboring nodes such as shown in FIG. 3 via token signal prioritization. Nodes A-H shown in FIG. 3 are connected via wires (typically two or more) in branch lines I, K and L. A node may comprise upload and download power capability such as nodes A, E, C and H. A node can be a power supplier, download only such as node B, F and G, and a node can be a power user upload only, shown as node D. All the nodes involved in a power selection scheme (such as two or more closest-neighboring groupings within FIG. 3) share a common frequency for the controlled group. Each controlled group has a specific signal generator and also sensor for that that specific common signaling frequency. For example a controlled group of nodes may consist of A, C D, and E shown in FIG. 3. These are close enough to receive a token frequency and most often share their power according to Kirchoff's laws of electricity current flow. When the signal generator is on (typically for a set limited time such as 20 minutes) the sensor for that node is inactive.

If a node sensor senses the specific frequency signal from another node within the controlled group, then the sensing node cannot use (or set its equipment to use) high priority power. For example a low node voltage threshold (which allows connected high priority appliances to use power down to that lower node voltage) is only available in the absence of sensing the specific frequency signal from neighbors. In other words, when the signal from another node is detected, the voltage threshold for turning on power consumption is set higher. This allows only one user at a time to consume local grid power when only low power is available, such as early morning, early evening, or during a rainstorm.

Only one neighborhood node of a given controlled group can assert the common signaling frequency at a time, but such node can only assert that privilege for a limited, set time, and (preferably) has to wait a set period of time after the privilege runs out, before asserting it again, to allow another a chance to assert his turn. This is carried out (in hardware, software, or a combination of both) by only allowing a node to assert its common signal frequency generator (typically onto the same power lines shared between nodes) when no one else is asserting the signal. Second, once turned on, the signal asserted from one node to the others automatically extinguishes after a period such as about (plus or minus 2) 15 minutes, 20 minutes, 25 minutes, 30 minutes or the like. After automatically extinguishing, a neighbor is free to turn on their signal because the previous signal automatically stays off for a period of time such as 0.5 minute, 1 minute, 2 minutes, 10 minutes, 20 minutes, 30 minutes or the like.

By doing this, neighbors are forced to share energy one at a time when there is not enough energy for more than one user. For example, in the early morning at low light levels 3 different neighbors each may want to take 800 watts from their common grid to boil water for coffee or make toast but maybe only 1000 watts are available. This system allows the entire grid to be available for one high priority user at a time for a duration sufficient for a small job, after which another neighbor can use the high priority power for their set period of time. If more than enough power (or a little extra) is available than is actually used, then automatically a lower priority appliance will use the remaining power because the node voltage will rise enough for a lower priority to turn on and draw the voltage down to a lower level.

In an embodiment, multiple neighborhoods of a local grid share power this way by each neighborhood controlled group having a different signal frequency. Because the signal sensor is specific, one neighborhood can use for example 25 KHz AC signal impressed on their grid lines whereas near by neighborhoods may use 40 KHz, 100 KHz etc. for their prioritization systems.

These and other embodiments will be appreciated by a skilled artisan reader of this description. For example an embodiment provides a power sharing system for efficiently using local grid power during periods of low power output based on signal tokens comprising: a grid with multiple nodes, each node comprises a signal generator of a common, specific frequency operably connected to send the signal as a token to neighboring nodes; and each node comprises a sensor for a signal token of the same common specific frequency emitted from other neighbors, wherein each node signal generator is blocked from sending a signal token to other neighbors during the time that a signal token from a neighbor is received, when a signal token is sent to other neighbors, the duration of such sending has a time limit, and after a signal token of the time limited duration has been sent, a blockout delay period ensues wherein that same node cannot send another signal token for a set period of time; and wherein receipt of the signal from a neighbor causes a lower priority of energy use from a common grid. The lower priority may be asserted by a node level threshold voltage set that allows grid power to be loaded (used) at that node only at a higher value. A low priority node would have a higher voltage threshold so that when the node is below that voltage (because other higher priority nodes are using the power, the node is prevented from using.

In an embodiment, each node separately senses signal token from its different neighbors and comprises a display that indicates the origin or origin direction of a particular received signal token. In an embodiment a node comprises a display that indicates the maximum time remaining for the duration of an active signal token and a node optionally comprises an input panel that allows reservation of signal token usage. Use of tokens can be monitored along with monitoring of power usage.

Smart Receptacle for DC Power

Many modern devices (cell phones/computers) can plug into the DC grid directly if the voltage is not too high (typically less than 240 volts, preferably 100-120 volts). And, resistance heaters that have switches and/or thermostats work fine if the DC current is chopped (typically 3%-10% off time for 50-100 Hertz). In an embodiment, a power interrupter circuit is provided that supplies appliances such as coffee makers, toasters, griddles, and hot water heaters, from direct current by thus interrupting the direct current power to the appliance by at least 10 hertz frequency, preferably between 25 to 1000 hertz and more preferably between 50 to 200 hertz. However, to prevent accidental use of an A.C. motor or old fashioned wall wart (transformer based power supply) the following smart receptacle is provided.

Figure 4:
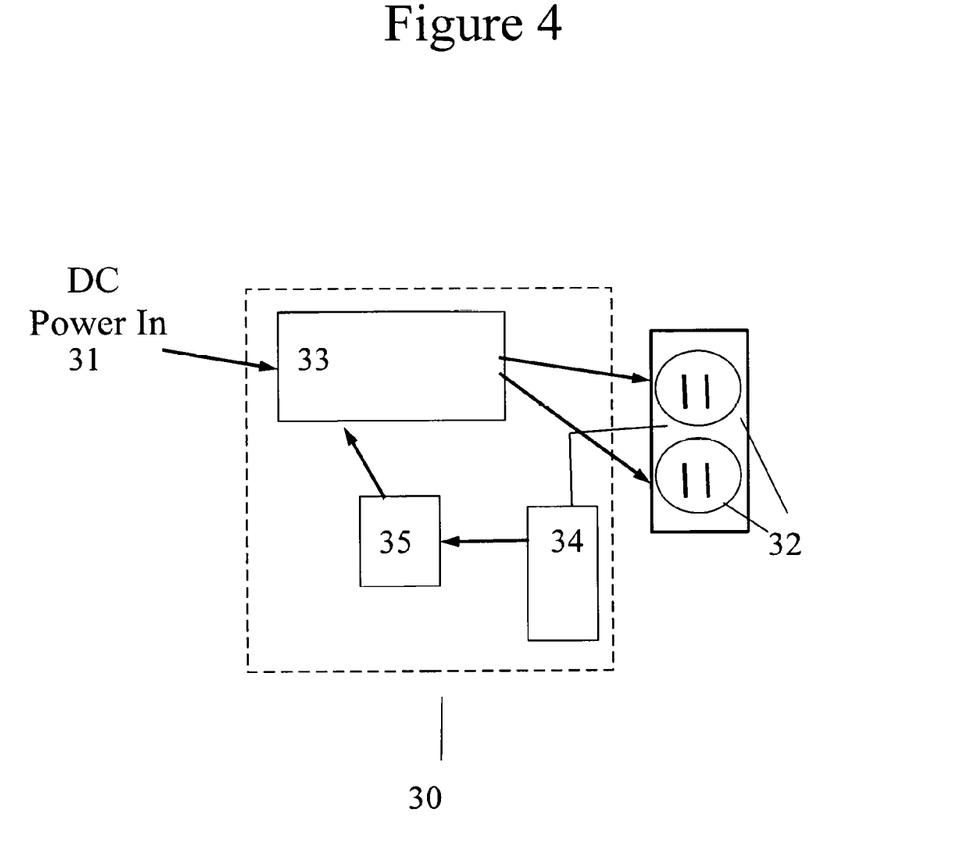
FIG. 4 is a block diagram of a smart outlet that senses an AC power load.

FIG. 4 shows a power outlet circuit 30 interposed between a DC power source 31 (typically a pulsed DC power as described above, or a direct connection to a grid or high voltage battery as outlined above and below) and a standard 15 amp or 20 amp AC outlet 32. Outlet circuit 30 connects to input DC power 31 and outputs to power plugs 32. An electronic valve 33 (preferably a MOSFET, IGBT or other solid state device) controls flow of power between input 31 and output power plugs 32. Sensor circuit 34 typically is connected to the output load and detects (preferably a minimum value) inductive load and if found, controller 35 turns off valve 33. In an embodiment valve 33 serves to create pulsed DC power from straight unpulsed power in 31 and can be turned off by sensor 34 and controller 35, which may be as simple as a logic level output from a sensor circuit, or a transistor that drives an enable pin on a PWM controller of circuit 33 or the like.

A microprocessor can infer electronic qualities of a load by receiving input of at least voltage, current flow and/or power or other sensed or calculated quantity over time and determine inductive load by looking for changes as described below. Typically a sensed or calculated signal indicative of connected inductive load is compared to a stored threshold value and triggers disabling of one or more outlets 32.

Each of these separately and/or in combination is a circuit. The inductance can be sensed a large number of ways including for example back (opposite) voltage spikes after the turn off known as "kick back." The term "circuit" used in this specification means electronic components connected as can be engineered by a hardware electronics engineer with at least 3 courses in circuit design in college and 2 years of experience and may represent a sub-circuit within a larger circuit. Also some or all of the operations of the circuit can be carried out in software by a microprocessor. For example, a microprocessor can detect a connection by software that repeatedly looks at conductivity between two points (the power plug 32). Upon sensing a connected appliance, a subroutine queries the connected device (senses resistance, inductance, and/or capacitance etc.) to determine the quality of the connected device During this time, an initial probe electricity can be used (such as low voltage of for example 5-50 volts) and not the total voltage (eg 120 volts) that the device may be designed for.

Pulsed DC Power, Controlled by Sensing Kick Back of Connected Equipment

In a preferred embodiment, the smart outlet provides pulsed DC power and senses kick back (also known as "back EMF" from motor windings, and well as other terms) from DC pulses. Preferably the power is a square wave train at a frequency of between 10 to 1000 Hz and more preferably between 50 to 200 hertz although other frequencies can be used. Preferably the duty cycle (% on time) is at least 50%, more preferably at least 85% and yet more preferably at least 95%. The kick back preferably measured is negative polarity spikes that occur immediately after the turnoff point of each cycle. A very simple and efficient method and device senses those opposite going spikes and responds by disconnecting the outlet (or turning off the DC pulse switch connection to high voltage DC power).

Preferably kick back is sensed during the off time and preferably a back biased diode (which may be a junction of a larger device such as a MOSFET) is connected to allow electricity of opposite voltage to flow to the sensor. The sensed opposing polarity signal, which is preferably measured as a voltage, may be measured as a maximum spike, integrated spike, maximum or integrated voltage within a period of time that the DC power supplied is off (off time of a large duty cycle), a current spike, a power measurement, a magnetic field, or even a heat sensor for a low resistance in series.

In an embodiment, a threshold negative polarity (with respect to the DC output) voltage, or power, or both, is sensed and used to determine if the connected load exhibits a response above a set value. For example, a vacuum cleaner motor can easily generate back EMF (negative polarity) kick back pulses that are several times the voltage of the pulsing DC output. These typically occur slightly later than initial kick back from a transformer. A transformer kick back can be high at initial activation (first turn off intervals of a square wave train). On the other hand, upon turn on via a wave train, a motor at first is not moving, and then is accelerating (less than 10%, 5% or even 1% of maximum running speed), and a back EMF kick back pulse following each successive turn off slowly increases. This increase can be detected to distinguish over the transformer. Some motors (it was found) such as electric drills may not generate an appreciable back EMF, while pumps and especially high rpm motors generally do even move but generate significant kick back in this situation and can be distinguished.

The threshold value (voltage magnitude in the negative polarity) can be set above where a 100 watt computer power adapter would be, but below what a connected AC induction motor or small transformer such as a wall AC adapter would generate. In an embodiment, a motor such as a vacuum cleaner motor can be used on the pulsing DC by operation of a defeat switch or sensitivity setting (which can be built in) that allows the motor to operate when plugged in, but does not allow an AC transformer to operate. For example a vacuum cleaner or related DC/AC motor can be distinguished from a transformer by the gradual change in reactance that occurs while the motor is increasing speed from the instant of turn-on whereas a transformer would not exhibit such change. By monitoring a decrease in total reactance (consumed starting power for example) during short times such as 0.05 seconds, 0.1 seconds, 0.2 seconds, or 0.5 seconds commencing from turn-on, a vacuum cleaner can be distinguished.

A skilled artisan readily will appreciate how to build a circuit (which preferably may include a microprocessor) that senses negative going kick back spikes. Preferably the kick back sensing occurs only during the off time of the pulsed DC and preferably emphasizing the early off time portion, since that is where the kick back occurs (upon collapsing of the magnetic field of the connected inductor). The term "early off time portion" in this context means the first 50%, first 20% or even more preferably the first 10% or less of the off time commencing with DC power turn off time of the duty cycle for long time duration (slow) pulses but preferably is measured during the off time part of the duty cycle for one, two, three, four or more of the first cycles after turn-on.

Response to Kick Back and Other Measurements

Upon sensing a critical level of kick back or other parameter indicating an inductive load such as a transformer or induction motor based pump, the circuit preferably disconnects power to the receptacle and alerts the user via a visual and/or audio signal. Preferably, the user resets the switch by activating a button and optionally by having to unplug and then plug in again a load to the receptacle.

In an embodiment, upon sensing an inductive load such as a transformer, the smart switch responds by disconnecting the (preferably pulsing) direct current power (or not turning this power on) and by connecting alternating current power to satisfy the detected AC appliance. Preferably the smart plug indicates the existence of sensed DC or AC power with indicator lights. Preferably, upon disconnection of the appliance, the smart plug resets and will initiate a new test for the next appliance power request.

In an embodiment the smart plug will accommodate appliances that require DC power of a given polarity. For example, some computer power adapters accept electricity when plugged in at one orientation, but when the adapter plug is inserted in a 180 degree opposite orientation, the power is not accepted, because of diode(s) within the adapter. This is also found in many infrared heaters that have half-power settings wherein the half power is achieved by switching in a diode to only allow one half of an alternating current to heat the heating coil. When using these heaters at half power, the heater sometimes will not work at the half power setting until the power plug of the heater is reversed. To accommodate this issue, an embodiment of the smart plug will test the appliance to determine if the appliance is wired to preferentially use one polarity over the other. This can be done by asserting one polarity power test voltage and then the opposite, and determining which is accepted by the appliance. In another, lower cost embodiment, a dual power outlet is provided, wherein one of the outlets is wired opposite polarity to the other, to allow the user to reverse polarity manually.

The following appliances were found to work well with pulsing DC power at 110 volts, and did not exhibit kick back pulses: coffee pot, hair dryer, infrared space heater (800 watt), 600 watt electric grill, 1400 watt electric grill, 300 watt kotatsu heater, 800 watt induction heater stove, computer power adapter, computer printer adapter, 5 volt power supply power adapter, and hand electric drills. The following appliances also worked well with pulsing DC power at 110 volts and exhibited back EMF that could be distinguished over that from a transformer or AC induction motor: vacuum cleaner, small Dremel drill, electric sander. The following appliances were tried but did not work suitably on pulsing DC: 18 volt 10 watt transformer, small aquarium pump, and small refrigerator.

When comparing transformers and pump motors (incompatible with pulsing DC) with the compatible equipment, the kick back pulses (short duration opposite polarity pulses during the off time, for 5% off time at about 100 hertz), were examined. In one set of measurements of reverse kick back voltage occurring across the output plug and without a reversed biased shunt diode to protect the switch, it was surprising discovered that the transformer and pump motor kick back pulses were no larger in absolute voltage magnitude than the voltage of the applied DC pulses made by the switch. However, the back EMF pulses from the vacuum cleaner and other high speed motors (sander, Dremel drill) were larger in absolute magnitude than the applied pulsed voltage. In an embodiment this difference in voltage is measured and used to sense and trigger a smart plug to turn off (or switch to AC power) when connected to a transformer or AC induction (such as a pump) motor. In this case, a kick back pulse (termed more often "back EMF" when referring to the kick back of a motor) having a sensed magnitude greater than the applied voltage (in opposite polarity) triggers the smart outlet to allow the motor to continue running.

In another embodiment the kick back pulse is detected and pulses above a threshold during the off duty cycle time are used to trigger the smart switch (pulses that exceed the threshold trigger off or switching to AC). In another embodiment the smart switch detects AC induction motors and transformers by sensing reactance or other unique conditions that exist immediately when power is applied and before the rotor of a motor begins to move, and/or before the rotor achieves speed, such as up to 10%, 5% or 2% of operating speed. This may be determined for example, during the first 5 milliseconds, first 10 milliseconds, first 50 milliseconds, first 100 milliseconds, first 250 milliseconds and the like. During this time, a transformer and AC induction motor both behave as a transformer with a shorted secondary winding, whereas a brushed motor (which is acceptable for DC power) presents the winding resistance. A skilled artisan can use a variety of circuits and microprocessor based calculations from sensed data to make this distinction and trigger the smart outlet as described herein.

A skilled engineer can design a circuit and program a microprocessor with time based voltage and/or current measurements to detect the difference between a mostly non-inductive resistance of the brushed motor vs the inductance of a transformer with shorted secondary during this short period of time after initial powering of the appliance, before the brushed motor has had time to rotate and change electrical contacting to the rotor. In an embodiment, the kick back voltage and or current may be compared with non-inductive power consumption during this initial time period, and the switch activated (to turn off, or switch into AC) when inductive signal vs non-inductive power exceeds a threshold.

In an embodiment a passive solenoid, or other circuit breaker is used in series with the load using a blocking diode, so that only the reverse polarity kick back pulse conducts through the solenoid (or circuit breaker). Sensitivity can be adjusted to allow only strong kick back signals to activate the turn off, but in an embodiment that protects small AC transformers, a voltage sensitive circuit is used that responds to high kick back pulses of higher impedance, and lower power. This is because a large AC/DC motor such as a vacuum or electric gardening cultivator motor often produces a back EMF and works at high current. On the other hand a transformer produces a back EMF (often higher, but not always compared to some motors) but works at lower current and this differential can be used to distinguish the two electrically this way as well.

Inductance Check via Separate Signal

In an embodiment, a pure hardware circuit made of op amps can determine whether a load is inductive, a software routine more reasonably would be designed by a skilled artisan to detect voltage lagging current (a sensed inductive load) by accepting data from one or more sensors or other electronic sensing, as a skilled artisan would readily appreciate. For example, application of a small voltage or short pulse less than 10 volts and then sensing of a rising voltage or decreasing current by two or more measurements made serially by a sensor(s) after entry of data into a file and their comparison is easily done with a microprocessor. If the plugged in device responds to an impressed voltage by current lagging the voltage over a short observation time (e.g. 0.1 sec, up to 0.5 sec etc.) then the device is inductive and the valve is turned off. Additional sensing techniques are available as is well appreciated by a skilled artisan. Preferably, the device has an alert signal such as a light or audio alarm or both, that also are turned on in response to a decision that the plugged in device is inductive. This is to alert the user that the device is rejected.

DC Pulse Power type: Current Sensing

In an embodiment the smart receptacle provides pulsed DC power and continuously monitors for inductance by looking for differential signals across a sensing resistance during pulses. In an embodiment, DC power is supplied as square wave pulses to the smart receptacle in series with a small resister R100. Resister R100 preferably is about 0.01 ohms to about 0.1 ohms. The voltage across R100 is sensed to determine in an inductance is in series with the resister (i.e. an inductive load is plugged into the smart plug).

In an embodiment, R100 voltage is sensed during the on phase of a square wave power pulse supplied to the load. This is sensed during at least a period near or at the first part (from turn on) of the power pulse. If an inductance becomes connected or is added to the load, then the voltage increases (such as exponentially) during the short interval following the turn on point in time. A circuit senses the increase in voltage or waveform across R100 during the interval starting at the turn on time of the square pulse (or shortly thereafter) and compares the change in voltage to a threshold. The change in voltage may be sensed a number of ways, as a skilled artisan readily can appreciate. For example, an op amp can be connected as a differentiation amplifier to generate a differential signal change of the voltage.

In an embodiment, a purely resistive load will generate a positive downgoing spike at the turn on of the square wave power and a negative spike at the turn off point of the square wave power. An inductive load will create a high and increasing (up-going) signal at the beginning of the square wave turn with a value and time duration dependent on the inductance and other reactance components of the load. In an embodiment, an initial short time at the beginning of the square wave is ignored and the increasing voltage from R100 is determined after a short delay, in order to avoid switching turn on noise.

Preferably the differentiator (hardware such as op amp or software driven microprocesser determination of voltage change) output is compared with a threshold stored value. If a positive signal, indicating an exponentially increasing voltage across R100 at or shortly after the beginning of the square wave turn on is greater than the threshold value, then the power is turned off to the smart plug output. In a preferred embodiment the sensed signals from at least 2-10 square wave cycles or preferably 5-100 cycles are averaged before making the comparison. This is particularly important when a load is first plugged in or turned on. In an embodiment the circuit senses when a load is first plugged in or turned on and waits a short period of time (such as 10 millisecond to 1000 milliseconds, preferably 20-200 milliseconds) before applying power. Upon sensing an increase in differentiated signal above the threshold, the power may be cut, with a signal to the user to unplug the appliance. Alternatively, the circuit may pause a period of time such as 10 seconds or a minute and then start over.

When using a microprocessor to carry out the comparison, preferably a stored program instructs the microprocessor to a. enter a sensed value of voltage (preferably as a voltage drop across a series connected load resistor) by going to an input location or pin and saving the sensed value at a memory location, comparing that saved value with a predetermined threshold value. If the saved value is greater than the predetermined value, then the microprocessor outputs one or more signals. The outputted signal preferably is a visual indicator (such as a red LED) to show that the load is unacceptable. In a preferred embodiment the microprocessor outputs a signal to turn off the load connection at least temporarily. This may be achieved by resetting a transistor driver to a MOSFET that is in series with a power line to the load, to turn off the MOSFET.

In a preferred embodiment the smart DC power plug continuously provides a square wave DC power and continuously (each square wave turn on) looks for an inductance (increasing voltage with time from rising square wave pulse turn on) across a low ohmic (preferably less than 0.2 ohms, more preferably less than 0.05 ohms, yet more preferably less than 0.02 ohms) resistance in series with the load. It is best to delay the first measurement at least one square wave pulse to minimize noise and to average at least 5 cycles when making the measurement for comparison. After finding the improper (inductive load above a threshold, the microprocessor or other hardware may a. decrease power such as applied voltage, duty cycle (decreasing to less than 10% or 5%), or even turn off for a set time, until the inductive load is removed or until a user resets the outlet manually.

The frequency and duty cycle of this embodiment may vary. Preferably square wave power is produced at a frequency of between 2 to 1000 hertz and more preferably between 25 and 200 hertz. Preferably the duty cycle off time is between 1% and 50% and more preferably between 5% and 50%.

Back Up Power, AC Plus DC Grid Power

In an embodiment, a node comprises a back-up power such as a battery that evens out the power by storing power from that node (or importing low priority power into the node for storage when available). The back up power can be used at the node or seamlessly supplement or supply constant on devices via its own wire pair on the grid.

In an embodiment however, both AC and DC power are supplied on the same wire or wires. The AC component can be separately added and removed as a skilled electronics engineer readily will comprehend. For example, an AC signal of 25-25,000 hertz (preferably 50-200 hertz) carrying always-on power at low level (for communications equipment or LED lighting etc) can be superimposed onto a DC current carrying wire. A node can download and harvest energy from the AC signal by running the power through a DC blocker such as a series capacitor and then rectifying the AC signal to produce a DC power or using the AC itself for the always on backup power. In an embodiment this is more easily achieved by using a higher frequency in the range of from 100 to 100,000 hertz. Higher frequencies are possible and desirable to allow lower capacitance for coupling, but tend to emit progressively more RF energy contamination into the surroundings.

In another embodiment that takes advantage of earth ground, a DC power is supplied through two wires, neither of which are connected to ground. One of the wires then has AC applied between that wire and ground to create an AC power that is kept separate from the DC power. In this latter embodiment, a low frequency of 50 or 60 Hertz is preferred when the use desires to exploit low cost existing hardware manufactured for AC. This latter embodiment is particularly preferred between two or more nodes that already share a good ground connection with each other by existing wires or pipes or other conductive path.

Energy Storage (Preferably Battery)

In an embodiment this device takes energy from the grid when low priority is available, as detected by at least a higher node voltage or received communication signal. In an embodiment, this device obtains energy to store locally, from same node or separate wire connected input into the device from a locally connected solar panel, wind generator or the like. In an embodiment this device only supplies backup power at its location (again, preferably via hard wire connection or plug in connection to the device itself. In another embodiment, the power storage coupler feeds backup power into the grid via attached node. This might occur in response to an emergency signal or other signal.

Each citation to art is specifically incorporated by reference in their entirety. Space limitations preclude further description of embodiments that readily will occur to a skilled artisan. For example one or more parts of each system such as that described in each figure may be omitted and the remainder used for benefit. All such embodiments especially in combinations and possible circuit permutations are intended within the ambit of the attached claims and future amended claims. A patent application entitled "Optimum use of solar electricity" filed by the inventor and published on Dec. 12, 2013 publication number 20130327077 on this topic and which is pending is specifically referred to and incorporated by reference in its entirety.

I claim:

1. A smart DC outlet that senses and protects against connection to an AC appliance, comprising:
    a source of pulsing direct current connected to two electrical connections of an electrical outlet;
    a sensor of back EMF connected to the two electrical connections of the electrical outlet; and
    a circuit that stops DC current from flowing through the two electrical connections in response to a detected kick back signal that exceeds a threshold value
    wherein the pulsing direct current is at a periodicity of more than 2 but less than 10,000 hertz.

2. The smart DC outlet of claim 1, wherein the pulsing direct current is between 90 and 125 volts at a periodicity of between 10 and 1000 hertz.

3. The smart DC outlet of claim 1, wherein the duty cycle of the pulsing direct current is between 50% and 97%.

4. The smart DC outlet of claim 1, wherein the pulsing direct current is generated by a PWM generator and a MOSFET or IGBT.

5. The smart DC outlet of claim 1, wherein the sensor and circuit comprise a PN diode junction forward biased for reverse voltage at the plug connections in series with a latching relay.

6. The smart DC outlet of claim 4, where in the sensor and circuit comprise a PN junction forward biased diode across the output, for reverse voltage, and a comparator wherein a comparator output turns off the MOSFET or IGBT.

7. A smart DC outlet that protects accidental powering an inductive load from direct current over at least two wires, comprising:
    a power connection plug from the at least two wires for a load;
    sensor for detecting induction response of the load and a comparator that senses an inductive load by comparing a differential signal obtained from the two wires that indicates an inductive load;
    a shut off that interrupts or prevents initiation of power to the load upon sensing an inductive load, and
    a signaling device for alerting a user that the load is not accepted by the smart DC outlet.

8. The smart DC outlet of claim 7, wherein before sensing a load, the circuit supplies a smaller sensing voltage DC power and after determining non-inductive status of the load, increases voltage for a normal load usage power.

9. The smart DC outlet of claim 7, wherein the power connection plug, the inductive load sensing circuit and an alert signal are within a common electrical outlet box.

10. The smart DC outlet of claim 7, wherein the sensor detects differential current in two wires that indicates a current lag situation due to a connected inductor.

11. A resilience energy apparatus for supplementing utility power while providing back up power, comprising:
    an input connection for utility power;
    an input connection for at least one DC power selected from local DC grid power and solar electric power;
    a connection to a storage battery for charging and discharging the battery;
    a high voltage pulsed DC power output receptacle for plugging in appliances; and
    a low voltage DC power output connection;
    further comprising a switch for a first position to alternately connecting to utility power for simultaneous use of utility power with DC power, or to a second position for DC power only;
    wherein
    the battery is automatically charged by utility power and DC power at the first position of the switch or DC power only at the second position of the switch; and
    the battery supplies low voltage DC power and supplies power to the high voltage DC power output when insufficient power comes from the two input connections.

12. The resilience energy apparatus of claim 11, comprising a DC to DC inverter that converts low voltage DC power to high voltage DC power to supply the high voltage DC power output receptacle and a high voltage to low voltage battery charger circuit for charging the battery from the two input connections.

13. The resilience energy apparatus of claim 11, wherein the high voltage pulsed DC power output has a voltage of between 110-125 volts and the at least one DC power selected from local DC grid power and solar electric power has a voltage between 10 to 20 volts higher.

14. The resilience energy apparatus of claim 11, wherein the at least one DC power selected from local DC grid power and solar electric power is from a solar panel system voltage of between 105 volts and 145 volts.

15. The smart DC outlet of claim 1, further comprising a defeat switch to allow a user to operate a vacuum cleaner after the smart DC outlet senses the induction of the vacuum cleaner.

16. The smart DC outlet of claim 1, further comprising a dual polarity mechanism that changes polarity of power output in response to sensed polarity of a plugged in appliance.

17. The smart DC outlet of claim 1, wherein the sensor comprises a circuit that senses kickback during an off time of the output pulsed DC power.

18. The smart DC outlet of claim 7, further comprising a defeat switch to allow a user to operate a vacuum cleaner after the smart DC outlet senses the induction of the vacuum cleaner.

19. The smart DC outlet of claim 7, further comprising a dual polarity mechanism that changes polarity of power output in response to sensed polarity of a plugged in appliance.

20. The smart DC outlet of claim 7, wherein the sensor comprises a circuit that senses kickback during an off time of the output pulsed DC power.

* * * * *